UNITED STATES PATENT OFFICE.

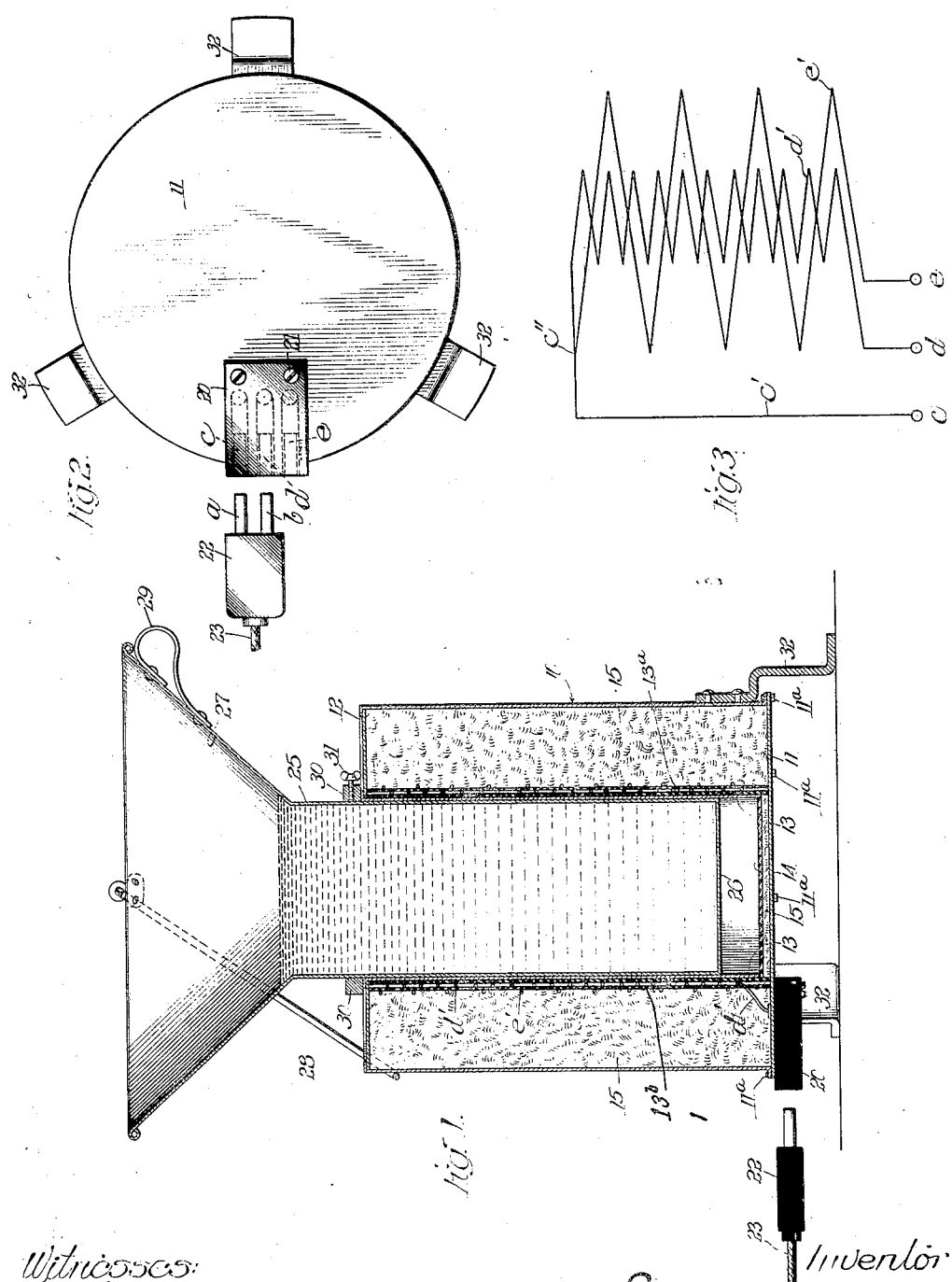

JOSEPH C. MORGAN, OF CHICAGO, ILLINOIS.

HEATER.

1,151,605.   Specification of Letters Patent.   Patented Aug. 31, 1915.

Application filed June 17, 1912. Serial No. 704,035.

*To all whom it may concern:*

Be it known that I, JOSEPH C. MORGAN, a citizen of the United States, residing at Chicago, in the county of Cook and State of Illinois, have invented certain new and useful Improvements in Heaters, of which the following is a specification.

My invention relates to heaters and, more particularly, to electric liquid heaters of a portable type.

The present invention is well adapted for use by surgeons or dentists in sterilizing their instruments, and for many purposes where a comparatively small body of water, oil, or a sterilizing compound is desired to be heated quickly to a high temperature, one such use in particular being by butchers in heating their knives in oil or water preparatory to cutting up meat.

As is well known, a knife immersed in hot water or oil takes on temporarily a better cutting edge than before it was so heated. Butchers, in particular, desire to heat their knives periodically while using them, not only to improve the cutting edge but, also, to loosen and render fluid the heavy or congealed grease which accumulates upon the sides of the blade, making its passage through the meat more easy and rapid.

A principal object of the present invention is to provide a portable heater well adapted for the purposes specified, which shall afford means to accurately control the temperature of the fluid or other material being heated.

Another object of the invention is to so construct and arrange the parts of the heater that heating units having different properties may be employed in a single heater and readily interchanged, one with the other, as occasion may require.

A further object of the invention is to provide a heater wherein the receptacle containing the material being heated may be readily removed from the device, so that the materials may be heated in one place and quickly carried to another for use and the vessel may be thoroughly cleaned.

A still further object of the invention is to provide a heater having these and other advantages which will be of simple and durable construction and which may be economically manufactured.

A preferred embodiment of the invention is illustrated in the accompanying drawings forming a part of this specification in which—

Figure 1 is a central vertical section of the improved heater; Fig. 2 is a bottom plan of the same showing the electric switch arrangement; and Fig. 3 is a diagrammatic illustration of the heating coils.

In these drawings, 10 indicates the side of a metallic casing having a bottom 11 secured by bolts 11ª, and a top 12. The top 12 has a circular central opening within which is secured a depending metallic tube 13 of substantially the same outside diameter as said central opening. The bottom of the tube may be closed by a metallic plate rigidly fastened to the tube 13 but, in practice, I prefer to employ a fibrous and heat-resisting plate 14 which is suitably held against the end of the tube 13 by a packing of asbestos 15, or other non-conductor of heat, with which the space between the inner tube 13 and the outer casing is filled.

A plug switch 20, having three recesses for the accommodation of plugs and, having the usual contact sleeves or springs well known in the art, is secured conveniently by screws 21 to the bottom of the heater as shown. A twin plug 22, being the terminal of a pair of wires 23 carrying electric current, is formed to have its plugs $a$ and $b$ enter the recesses $c$ and $d$, respectively, or $d$ and $e$, respectively, and thus supply current to the heater. Within the heater and surrounding the inner tube 13 there is provided a thin tube or sleeve 13ª of insulating material closely fitting said tube 13 and adapted to be slid upon or withdrawn from said tube when the bottom 11 is removed from the side 10. On this supplementary tube 13ª are arranged two coils of resistance wire adapted to become heated by the passage of current therethrough and communicate heat to the casing or tube 13 and any object therein. The wire of these coils may be of German silver or other suitable metal affording the necessary current resistance and durability, such metals being well known in the art, the various turns and coils being insulated from each other. While in Fig. 1 of the drawings the two coils are shown one outside the other and separated by the tubular insulation 13ᵇ, in practice I sometimes prefer to have both coils in close proximity to the tube 13ª, the turns of one coil lying between turns of the other, but spaced and insulated therefrom. The two coils, whether wound one within the other or separated by the tubular insulation 13ᵇ form together a single electric heating unit which is readily secured to the bottom member. By the provision of a heating coil secured upon a removable member it is possible to replace such coils, if necessary, from time to time with the minimum of inconvenience and expense and the same heater may be used on currents of greatly differing voltages and thus meet varying demands merely by the ready insertion of coils of suitable proportions and winding.

As shown in Fig. 3, the ends of the heating coils are secured to the terminals $d$ and $e$ of the switch 20. In order that the heat supplied to the water receptacle, hereinafter to be described, may be varied by reducing the amount of heated wire in the heater, there is provided a wire $c'$ leading from the terminal $c$ of the switch to any given point on the heating coil, for instance, at $c''$ at the top of the coil. It will now be seen that when the twin plug 22 is connected with the terminals $c$ and $d$ the current will flow only through the coil $d'$, while if the plugs are inserted in the recesses $d$ and $e$, respectively, the current will flow through both coils $d'$ and $e'$ and the amount of heat produced proportionately decreased.

Within the tube 13 there is fitted a tubular receptacle 25 having a closed bottom 26 and a funnel-shaped top 27 provided with a carrying bail 28 and a tipping handle 29. The tubular receptacle is slidable within the tube 13, and when the parts are operatively arranged telescopes within the heating unit. On the tubular portion 25 there is arranged a sliding collar 30 adjustable upon said portion by means of a thumb-screw 31, said collar acting as a stop or rest for the liquid container 25. By fastening this collar higher or lower upon the tubular portion 25 the temperature of the liquid within this portion may be varied from time to time, or for particular purposes as desired. The deeper this portion 25 is inserted within the heating well the hotter will the liquid become in a given time. This container is also made of sheet metal and is preferably provided with a flat bottom so that it will stand upon a suitable flat surface when outside the heater. The whole device is supported by metallic legs 32 riveted to the side 10.

While there is herein illustrated and described a preferred embodiment of these improvements, it will be evident to those skilled in the art that some changes may be made in the arrangement and construction of parts without departing from the spirit or scope of the invention.

I claim:

1. In a heater, the combination of a casing, an electric heating element supported by said casing, a receptacle telescoped within said casing, and a collar coöperating with said receptacle and casing to adjustably support said receptacle in the desired position relative to said casing, whereby the effect of said heating element is varied.

2. In a heater, the combination of a casing provided with a removable bottom, an electric heating element supported by said bottom within said casing and removable from said casing when said bottom is removed, a receptacle telescoped within said casing, and means coöperating with said receptacle and casing to adjustably support said receptacle in the desired position relative to said casing, whereby the effect of said heating element is varied.

3. In a heater, the combination of a casing, an electric heating element supported by said casing comprising a plurality of resistance conductors electrically insulated from each other, means for selectively directing current through one or both of said conductors, a receptacle telescoped within said casing, and means coöperating with said receptacle and casing to adjustably hold said receptacle in the desired position relative to said casing, whereby the effect of said heating element is varied.

4. In a heater, the combination of a heat insulated casing provided with a removable bottom, an electric heating element supported by said bottom within said casing comprising an electric insulating member and a plurality of resistance conductors disposed thereon and electrically insulated from each other, means for selectively directing current through one or both of said conductors, a receptacle telescoped within said casing, and means coöperating with said receptacle and casing to adjustably hold said receptacle in the desired position relative to said casing, whereby the effect of said heating element is varied.

JOSEPH C. MORGAN.

Witnesses:
W. R. BROWN,
T. V. ARMOND.